United States Patent
Balachandran et al.

(10) Patent No.: US 8,526,891 B2
(45) Date of Patent: *Sep. 3, 2013

(54) SYSTEM AND APPARATUS FOR INTERFERENCE SUPPRESSION USING MACRODIVERSITY IN MOBILE WIRELESS NETWORKS

(75) Inventors: Kumar Balachandran, Cary, NC (US); Leonid Krasny, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/162,044

(22) Filed: Jun. 16, 2011

(65) Prior Publication Data

US 2011/0244915 A1 Oct. 6, 2011

Related U.S. Application Data

(63) Continuation of application No. 12/129,918, filed on May 30, 2008, now Pat. No. 7,983,623.

(60) Provisional application No. 60/929,269, filed on Jun. 20, 2007.

(51) Int. Cl.
*H04B 1/00* (2006.01)
*H04B 7/00* (2006.01)

(52) U.S. Cl.
USPC ......... 455/69; 455/68; 455/67.11; 455/67.13; 455/522; 455/561; 375/296; 375/299; 375/346; 375/358

(58) Field of Classification Search
USPC ............. 455/522, 67.11, 67.13, 67.14, 67.16, 455/67.7, 68–70, 561, 562.1; 375/232, 233, 375/295, 296, 299, 346, 347, 358
See application file for complete search history.

(56) References Cited

U.S. PATENT DOCUMENTS 6,295,289 B1 * 9/2001 Ionescu et al. ............... 370/342
6,930,981 B2 * 8/2005 Gopalakrishnan et al. ... 370/252
(Continued)

FOREIGN PATENT DOCUMENTS

| EP | 0 999 658 A2 | 5/2000 |
|----|--------------|--------|
| EP | 1 175 022 A2 | 1/2002 |
| KR | 20020092747 | 12/2002 |
| KR | 20030058265 | 7/2003 |

OTHER PUBLICATIONS

Leonid G. Krasny et al., "Transmit Diversity with Constrained Feedback", 14$^{th}$ 1st Mobile and Wireless Communication Summit, 2005, 4 pages.

(Continued)

*Primary Examiner* — Tuan A Tran
(74) *Attorney, Agent, or Firm* — Nixon & Vanderhye P.C.

(57) ABSTRACT

In a wireless network, plural downlink signals from plural base stations are transmitted to a terminal. The plural downlink signals all carry the same information to the terminal. The terminal provides feedback on the downlink channels. The feedback provides information on the taps of the channels. The amount of information fed back is constrained. Based on the feedback, transmission parameters of the downlink signals are adjusted. The process of transmitting, providing feedback, and adjusting the parameters continue so that the energy of the downlink signal is enhanced at the terminal location and suppressed elsewhere. Beam forming can be used to further suppress the energy signature at locations other than the terminal location.

30 Claims, 9 Drawing Sheets

(56) References Cited

U.S. PATENT DOCUMENTS

| | | | |
|---|---|---|---|
| 7,248,645 B2* | 7/2007 | Vialle et al. | 375/299 |
| 7,366,253 B2* | 4/2008 | Kim et al. | 375/299 |
| 7,376,192 B2* | 5/2008 | Koorapaty et al. | 375/259 |
| 2005/0037718 A1* | 2/2005 | Kim et al. | 455/101 |
| 2009/0016425 A1* | 1/2009 | Hui et al. | 375/240 |

OTHER PUBLICATIONS

International Preliminary Report on Patentability & Written Opinion mailed Sep. 25, 2008 (6 pages).

Notification to Grant from Chinese Patent Office w/English Translation dated Oct. 24, 2012 (4 pages total).

* cited by examiner

SYSTEM AND APPARATUS FOR INTERFERENCE SUPPRESSION USING MACRODIVERSITY IN MOBILE WIRELESS NETWORKS

RELATED APPLICATION

This application is a continuation of U.S. application Ser. No. 12/129,918 filed May 30, 2008 now U.S. Pat. No. 7,983,623, the entire content of which is incorporated by reference. The technology described herein also related to and claims the benefit of Provisional U.S. Patent Application No. 60/929,269 entitled "SYSTEM AND APPARATUS FOR INTERFERENCE SUPPRESSION USING MACRODIVERSITY IN MOBILE WIRELESS NETWORKS" filed on Jun. 20, 2007, the entirety of which is incorporated by reference thereof.

TECHNICAL FIELD

The described technology pertains to telecommunications, and in particular pertains to systems and methods of suppressing interference using, e.g., macrodiversity in mobile wireless networks.

BACKGROUND

The introduction of new services in wireless networks has put a premium on spectral efficiency and coverage in cellular networks. Cellular networks have come a long way since the analog voice telephone systems of the mid 1980s, such as the Advanced Mobile Phone Service (AMPS) or the Nordic Mobile Telephone (NMT) System. The 1990s saw the introduction of second generation (2G) digital cellular technologies such as the Global System for Mobile Communication (GSM) and packet data systems such as the General Packet Radio Service (GPRS) and their evolved third generation versions, Enhanced Data Rates for Global Evolution (EDGE) and Enhanced GPRS (EGPRS) respectively. The need for higher bandwidths and data rates has also led to standardization of the Universal Mobile Telephone Service (UMTS). Third Generation (3G) standardizations of GSM/EDGE and UMTS have been carried out by the 3GPP (Third Generation Partnership Project) whose focus at the time of this invention has been on specifying the High Speed Packet Access (HSPA) service for WCDMA and the OFDM-based evolution of 3G in a standard known as Long Term Evolution (LTE).

Much of the latest work to improve data rates, coverage and capacity has been on the use of multiple antenna technologies such as those illustrated in FIGS. 1A, 1B and 1C. FIG. 1A illustrates multiple antenna elements with physical separation between antenna elements. FIG. 1B illustrates antennas grouped into multiple groups. The physical separation of the antenna elements within a group is less than the separation between the groups. FIG. 1C illustrates a phased array antenna. Space-time Transmit Diversity (STTD), beam-forming and Spatial Multiplexing (SM) or Multiple-Input Multiple Output (MIMO) have been proposed as options in various 3G standard contributions, as well as concepts such as Per-Antenna Rate Control (PARC) or Per-Stream Rate Control and Selective PARC when applied to beam-forming.

Multiple antenna systems work reasonably well in enhancing data rate or coverage and capacity. However, they face some deficiencies in getting the maximum possible gains in performance. First, many multiple antenna technologies rely on the Carrier-to-Interference Ratio (CIR) being sufficiently high in order to realize the performance gains possible. However, mobile terminals that are disadvantaged with respect to the connected base station (e.g., far distance from the base station) may not have such high CIRs.

Second, current state of the art, is limited in the ability of these multiple antenna systems to suppress interference levels elsewhere in the cell (or coverage area), while improving desired signal energy towards the terminal that the network is communicating with. This is because simultaneous increase in signal energy in one part of the coverage area while suppressing interference levels in the rest of the coverage area is an ill-formed problem and generally difficult to solve using systematic methods.

SUMMARY

The described technology relates generally to apparatuses and methods for communication between plural base stations and a terminal in a wireless network. In a non-limiting aspect, plural downlink signals are transmitted from plural base stations to a terminal. Each downlink signal is transmitted on a downlink channel of the corresponding base station. The plural downlink signals all carry the same information to the terminal. The terminal provides feedback regarding the channels and taps of the downlink signals for each channel. Based on the feedback, the parameters of the downlink signal transmission are adjusted continually or intermittently.

The transmission parameters are adjusted such that the energy of the downlink signals transmitted from the plural base stations is enhanced in a vicinity of the terminal and simultaneously is suppressed at other locations of the coverage area of the plural base stations. In addition, the plural downlink signals coherently combine in the vicinity of the terminal.

In one non-limiting embodiment, TDCF (Transmit Diversity with Constrained Feedback) is used as the feedback mechanism for each of the plural base stations. The terminal provides as feedback partial information on the taps of the downlink channels of each base station. This forward link knowledge is used to adjust the transmission parameters of the channels.

When beam forming is used in conjunction with TDCF, the energy of the transmitted signal is further suppressed at locations other than the terminal location.

A non-limiting example method for wireless communication from the perspective of the plural base stations includes transmitting plural downlink signals from the plural base stations to a terminal. The plural downlink signals carry the same information to the terminal. The method also includes receiving a feedback from the terminal regarding the plural downlink signals, and further includes adjusting the transmission parameters for each downlink signal based on the feedback. In the method, each base station transmits its downlink signal on a corresponding downlink channel and each downlink channel includes plural taps. The feedback from the terminal includes information regarding one or more taps of each downlink channel corresponding to each base station. The feedback information can include transmission coefficients of the taps and the tap delays.

The plural base stations are geographically spaced apart from each other such that the shadowing characteristics of the downlink channel from one base station is independent of the shadowing characteristics of another base station. Each base station is capable of communicating with the terminal independently from the other base stations.

If the terminal is fixed or changes location very slowly, then the transmission parameters of the channels for the terminal are pre-configured. This further reduces the amount of information fed back during the communication operation. Also, the transmission parameters can be optimized to maximize the data transfer rate.

The feedback from the terminal can be received and processed by an anchor base station. The anchor base station, upon adjusting (or determining the necessary adjustment for) the transmission parameters for each base station, the anchor base station notifies other base stations and the transmission can take place based on the adjustments to the transmission parameters.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

Figure 1A:
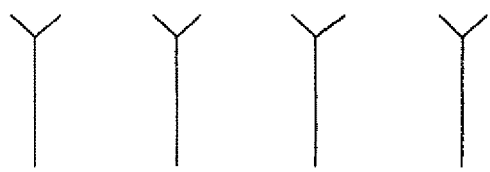
FIGS. 1A, 1B and 1C illustrates examples of antenna arrangements for base stations.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

One of multiple goals of the described technology is to enhance the downlink transmission signal at a desired location (in the vicinity of the receiving terminal) while suppressing the same signal elsewhere in the coverage area so as to reduce interferences. One scheme to achieve this goal is explained with reference to FIG. 2 which illustrates a non-limiting embodiment of a wireless network 200. The network 200 includes multiple base stations 210 connected with each other via one or more routers 220. The network 200 communicates with other networks via one or more access network gateways 230.

Figure 2:
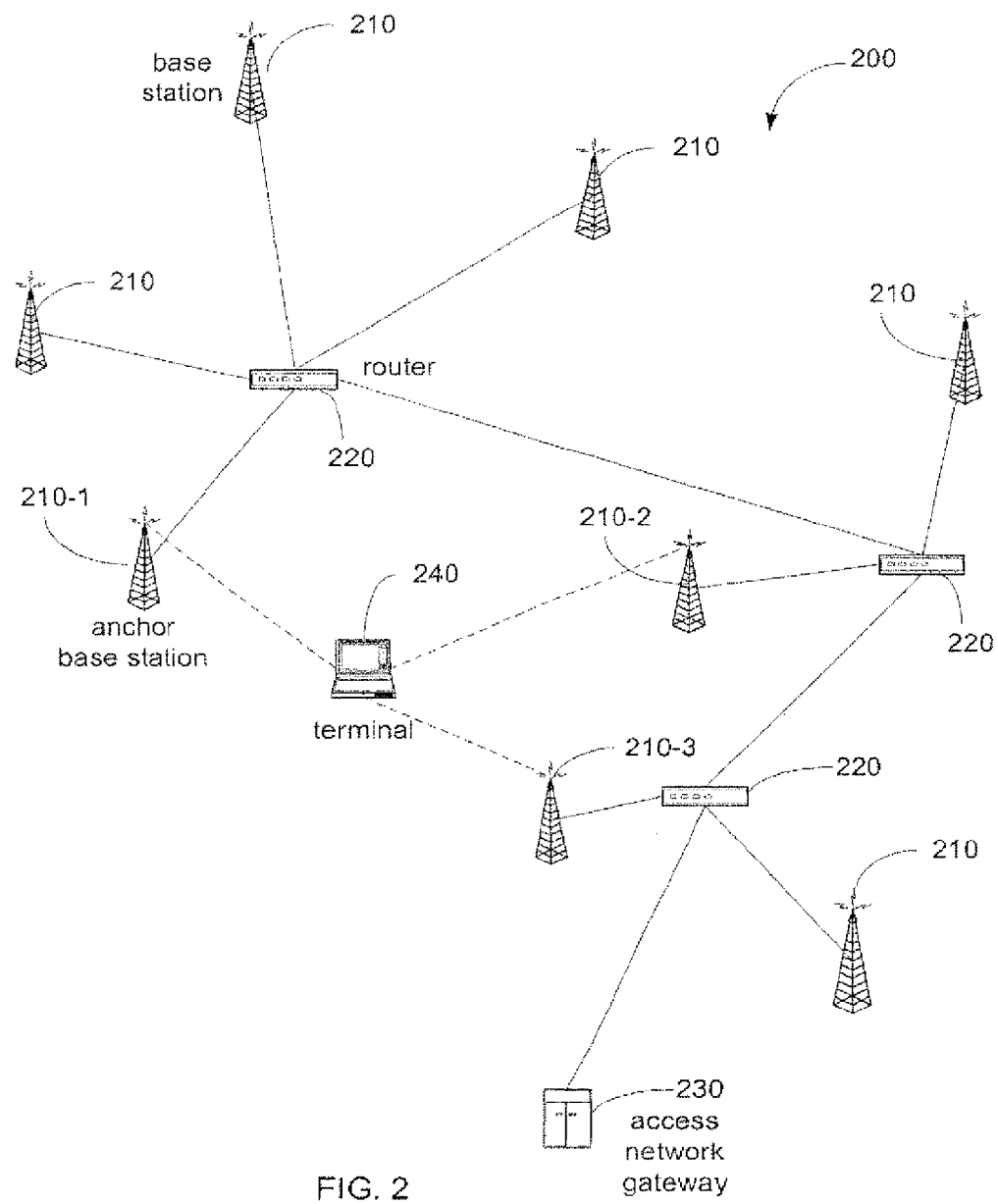
FIG. 2 illustrates an embodiment of a wireless network.

In FIG. 2, plural base stations 210-1, 210-2 and 210-3 communicate with a terminal 240 in which the communication links between the plural base stations 210-1, 210-2 and 210-3 and the terminal 240 are represented with dashed lines. An anchor base station 210-1 coordinates the communication activities in this embodiment. As an example, the anchor base station 210-1 may be a Node B element in an LTE network. The details of the coordination activities will be provided further below.

In FIG. 2, the anchor base station 210-1 is one of the plural base stations 210-1, 210-2 and 210-3 communicating with the terminal 240. While this is preferred, it is not strictly necessary. A base station 210 that does not provide downlink signals to the terminal 240 can be used as the anchor base station. As long as the base station 210 can receive feedback information from the terminal 240, it can serve as the anchor base station.

Also, the number of base stations 210 communicating with the terminal 240 is not limited to three. It is only necessary that there are plural—i.e., two or more—base stations 210 communicating with the terminal 240. The terminal 240 may be fixed such as a fixed relay or mobile such as a user equipment. While a single terminal 240 is illustrated for brevity and for ease of explanation, multiple terminals 240 are contemplated.

Figure 1B:
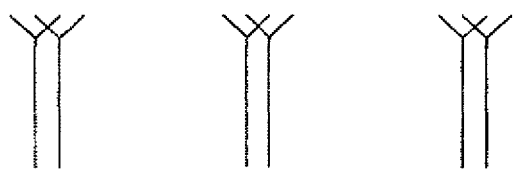
Figure 1C:
Figure 3:
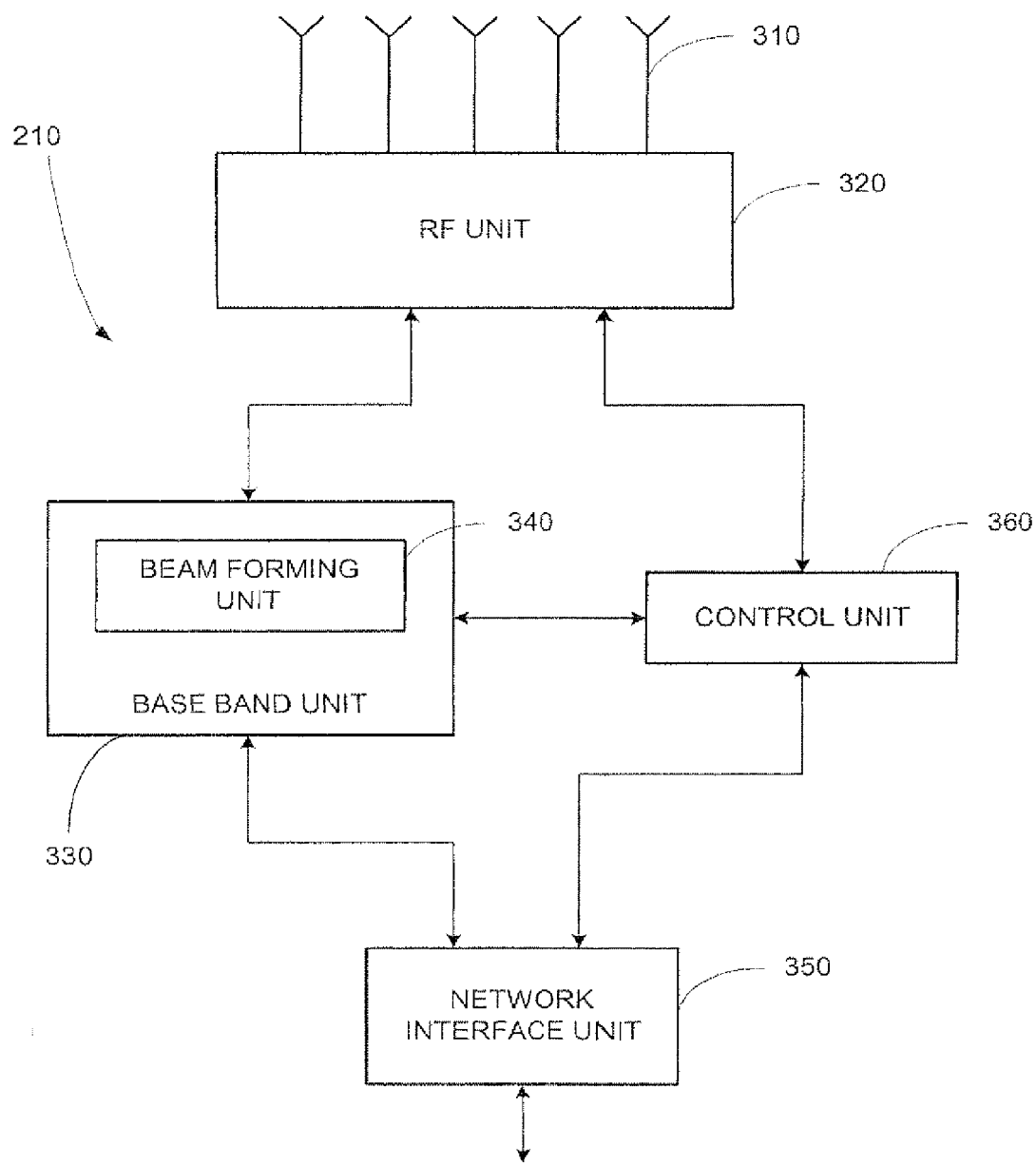
FIG. 3 illustrates an embodiment of a base station.

FIG. 3 illustrates an example non-limiting embodiment of a base station such as the base stations 210 in FIG. 2 including the plural base stations 210-1, 210-2 and 210-3 used to communicate with the terminal 240. The base station 210 includes a radio (RF) unit 320 with one or more antenna elements 310 to transmit downlink signals to the terminal 240 and to receive uplink signals from the terminal 240. The antenna elements 310 may be arranged in manners as illustrated in FIG. 1A, 1B or 1C. The base station 210 also includes a base band unit 330 and a network interface unit 350. The network interface unit 350 is arranged to provide the base band unit 330 with the data to be transmitted to the terminal 240 and to provide data received from the terminal 240 to the underlying network 300.

The base band unit 330, in conjunction with the RF unit 320, converts the data from the network interface unit 350 into the downlink signal transmitted to the terminal 240. Conversely, the base band unit 330 and the RF unit 320 converts the uplink signal received from the terminal 240 into data and provides the received data to the network interface unit 350. Optionally, the base band unit 330 includes a beam forming unit 340. The beam forming unit 340 is arranged to form signal beams using the antenna elements 310 of the RF unit 320. Operations of the components of the base station 210 are controlled by a control unit 360.

Referring back to the network 200 in FIG. 2, feedback is employed for each of the plural base station 210-1, 210-2 and 210-3 which communicates with the terminal 240. One type of feedback is TDCF (Transmit Diversity with Constrained Feedback), which is described in a paper "Transmit Diversity with Constrained Feedback", (Leonid Krasny, Jiann-Ching Guey, and Ali Khayrallah, 14$^{th}$ IST Mobile and Wireless Communication Summit, 2005) authored by one of the inventors of the present subject matter along with others. In the paper, TDCF is presented as a transmit diversity scheme and is proposed for the evolution of the MIMO (Multiple Input Multiple Output) systems. TDCF is primarily intended for the downlink, and requires the terminal to communicate partial channel information back to the base station.

In TDCF, demodulation complexity is shifted from the terminal to the base station where a partial knowledge of the downlink channels is used to pre-filter the signals on each transmit antenna of the base station so that the multi-path components of the signal received at the mobile terminal combine coherently, simultaneously exploiting both antenna diversity and implicit frequency diversity in the MIMO channel. The pre-filtering essentially flattens the spectrum of the effective MIMO channel thus concentrating the energy in a single channel tap. In a CDMA system, this allows the use of an extremely simple single-tap RAKE receiver. In an OFDM system, such pre-filtering can greatly reduce the complexity of the receiver, where signals from multiple antennas combine coherently without interference between themselves.

Figure 4:
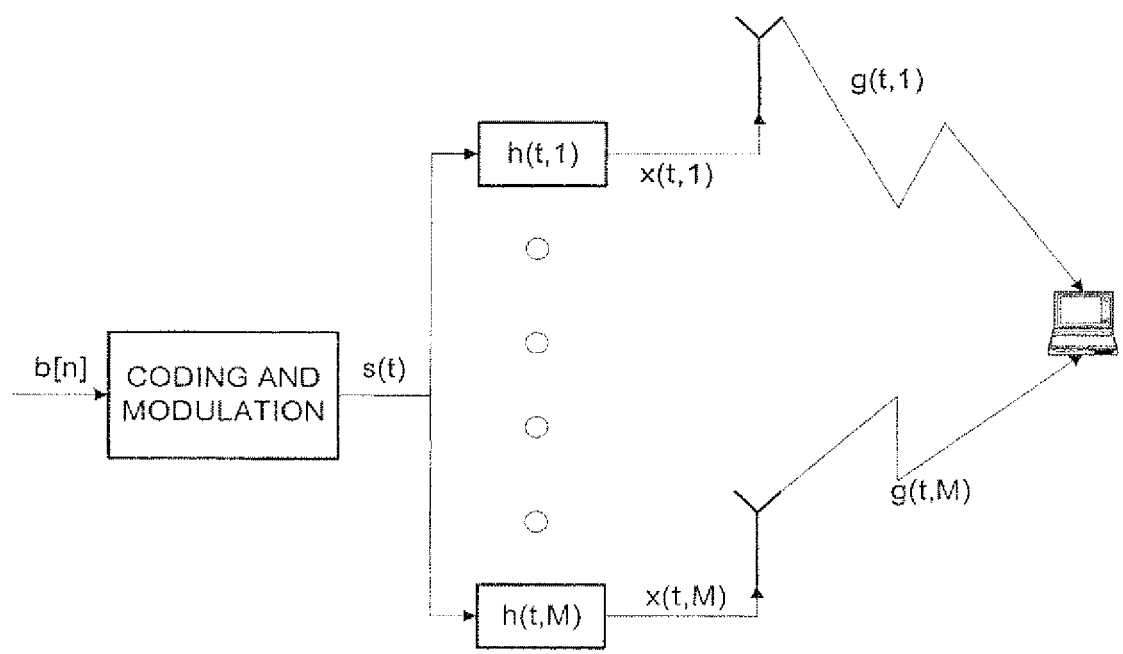
FIG. 4 illustrates an example modeling of a downlink signal transmission from a single base station using multiple antennas.

Particulars of TDCF is explained with reference to FIG. 4, which models a downlink signal transmission from a single base station using multiple antennas. In FIG. 4, b[n]'s are the information bits at the transmitter that are coded and modulated to get an analog, complex, base band signal s(t). The base station transmitter has M transmit antennas, and on the m-th antenna, the signal s(t) is passed through a pre-filter with impulse response h(t,m), which has a corresponding Fourier transform H(ω,m).

The impulse response of the channel from the m-th transmit antenna to a single receive antenna of the terminal is denoted as g(t,m), which has a corresponding Fourier transform G(ω,m). Thus, the signal received at the terminal due to the data signal s(t) is given by the following equation (1).

$$x(t) = \sum_{m=1}^{M} h(t, m) * g(t, m) * s(t) \quad (1)$$

In equation (1), "*" denotes convolution. The total power transmitted from all M antennas can be fixed at $\sigma_x^2$. That is, the impulse responses $\{h(t,m)\}_{m=1}^{M}$ are normalized such that the total transmit power is at a predetermined level $\sigma_x^2$.

In a conventional feedback scheme referred to as TDRF (Transmit Diversity with Rich Feedback), channel information of the downlink channels of the base station transmitters are also fed back to the base station by the terminal. The knowledge of the downlink channels is used to pre-filter the signals on each transmit antenna so that the multipath components of the signals received at the terminal coherently combine.

For the TDRF scheme, the impulse response of the pre-filter on the m-th antenna is given by equation (2).

$$h(t,m) = \lambda g^*(-t,m) \quad (2)$$

where $$\lambda = \left( \sqrt{\sum_{m=1}^{M} \int |G(\omega, m)|^2 d\omega} \right)^{-1} \quad (3)$$

Here, λ is a real, positive scaling factor used to ensure that the total transmit power is constant, regardless of the actual channel realization. It can be seen that the TDRF scheme requires the forward link channel knowledge be fed back explicitly from the terminal. The amount of such feedback can be substantial, because it is proportional to the number of the channel's taps times the number of transmit antennas.

On the other hand, the TDCF scheme reduces the amount of information fed back from the terminal to the base station. In TDCF, each pre-filter h(t,m) is a simple finite impulse response (FIR) filter with limited number of taps, which is expressed in equation (4).

$$h(t, m) = \bar{\lambda} \sum_{i=1}^{L} \alpha_i(m) \delta(t - \tau_i) \quad (4)$$

where $\alpha_i(m)$ are the coefficients for the m-th pre-filter, $\tau_i$ is a delay corresponding to the coefficients $\alpha_i(m)$ and $\bar{\lambda}$ is a real, positive scaling factor used to ensure that the transmitted power is at a predetermined level such as $\sigma_x^2$. In TDCF, optimal solutions are found for these parameters with respect to a certain performance criterion under some constraint on the amount of feedback.

The number of taps L for which information is fed back is less than the total number of taps M for the downlink channel between the base station and the terminal. Thus, compared to the TDRF scheme, the amount of information fed back to the base station is reduced for the TDCF. The number L can be chosen to achieve a compromise between reducing the amount of information fed back and maintaining the quality of transmitted signals at a satisfactory level.

There are various approaches available to choose the coefficients $\alpha_i(m)$ and delays $\tau_i$. In one, the coefficients $\alpha_i(m)$ and delays $\tau_i$ can be chosen to maximize the information rate that can be reliably transmitted from the base station to the terminal:

$$R = \int_\omega \log\left(1 + \left|\sum_{m=1}^{M} H(\omega, m) G(\omega, m)\right|^2\right) d\omega \quad (5)$$

where $$H(\omega, m) = \bar{\lambda} \sum_{i=1}^{L} \alpha_i(m)\exp\{-j\omega\tau_i\} \quad (6)$$

is the frequency response of the m-th pre-filter. In practice, this optimization is generally difficult to solve. Thus, suboptimal receivers such as MMSE (Minimum Mean Square Error) estimator may be used.

Another approach is to choose the coefficients $\alpha_i(m)$ of the taps with highest energies as received by the terminal. In this MAX L-taps approach, the coefficients $\alpha_i(m)$ of the highest L taps are chosen to be reported back to the base station. Note that the number L can be predetermined, and is preferably less than M.

In a variation to this approach, each channel tap whose received energy level exceeds a predetermined individual threshold energy level can be used to determine the channel taps for which the feedback information will be provided. For example, for the downlink channel taps of a base station, each tap whose energy signature is above a predetermined dB level (e.g., 3 dB) may be reported.

In another variation, a predetermined cumulative threshold level may be used. For example, the highest energy taps whose cumulative energies sum to exceed the predetermined cumulative threshold level may be reported. In a further variation, a predetermined percentage threshold may be used. As an example, the highest energy taps whose cumulative energies sum to exceed the predetermined percentage threshold (e.g., 70%) of the total energy transmitted by the base station to the terminal may be reported.

In general, the feedback includes both the coefficients $\alpha_i(m)$ and the delays $\tau_i$ for the L taps. At the base station, the coefficients $\alpha_i(m)$ and optionally the delays $\tau_i$ for the channel taps are adjusted.

A third approach to choose the taps is referred to as the Fixed-Grid L-Taps approach. This is an alternative to choosing the L strongest taps for each transmit antenna. In this approach, a grid of evenly-spaced L fingers is placed on a "region" of signal energy indicated by the power/delay profile, which is a map of the concentration of received signal power at the fixed grid points in time, and the terminal searches for the best position of the grid. Since the grid positions and the finger positions are the same for all antennas, the absolute delay of the grid is irrelevant. Therefore, no feedback information for the tap delays is required for this approach.

In the paper, it is shown that the TDCF transmitter is able to achieve data rates very close to the capacity of the MIMO channel. However, maximizing the signal energy towards a terminal could result in signal energy being maximized elsewhere in the coverage area of the transmitter, i.e., base station. Such a "flashlight effect" can cause unwelcome interference to other mobile terminals in the system.

Figure 5:
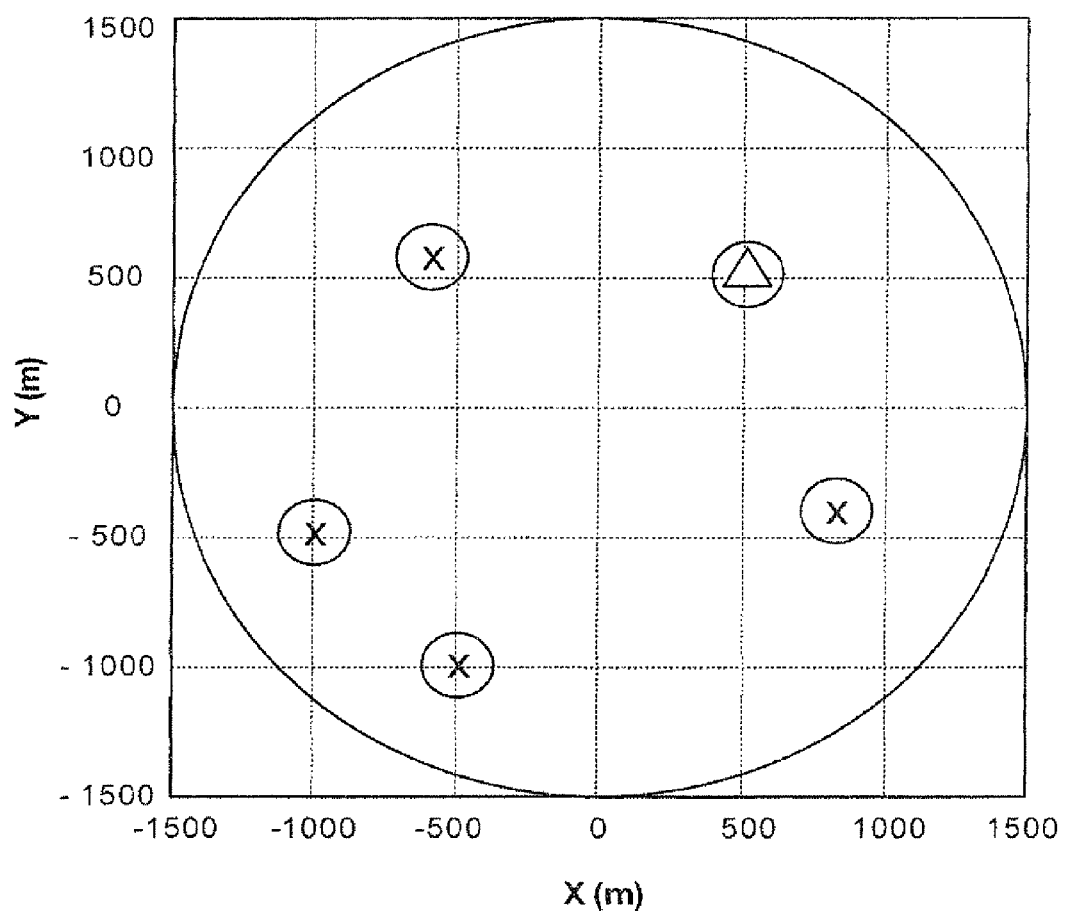
FIG. 5 illustrates an example modeling of a flashlight effect.

The flashlight effect is explained with reference to FIG. 5 which illustrates a typical coverage area of a single base station where the coverage area is represented as a circular area. While not shown, the base station is assumed to be situated at the origin (0,0) and the terminal is assumed to be situated at coordinates (500, 500). TDCF implemented from the base station towards the terminal produces a region of high signal energy around the terminal location as illustrated by a triangle enclosed by a circle at the coordinates (500, 500). However, other regions of high energy can randomly be spread around the serving area as represented by "X" enclosed by circles located at other coordinates demonstrating the occurrence of the flashlight effect. The regions of undesirable high energy can cause interferences to other mobile terminals located in these other regions.

Using TDCF to transmit downlink signals from a base station to a terminal is advantageous in that the signal at the location of the terminal is at a relatively high level which can increase the SNR (signal-to-noise ratio). However, a disadvantage is that the same signal can also be relatively high at other undesirable locations which can cause interferences.

To counter the disadvantage while maintaining the advantage, plural base stations 210-1, 210-2 and 210-3 are used with feedback from the terminal 240 in FIG. 2. In FIG. 2, feedback is employed for each of the plural base station 210-1, 210-2 and 210-3 used to communicate with the terminal 240. The feedback may be constrained, i.e., TDCF may be used for each of the plural base stations 210-1, 210-2 and 210-3.

Figure 6:
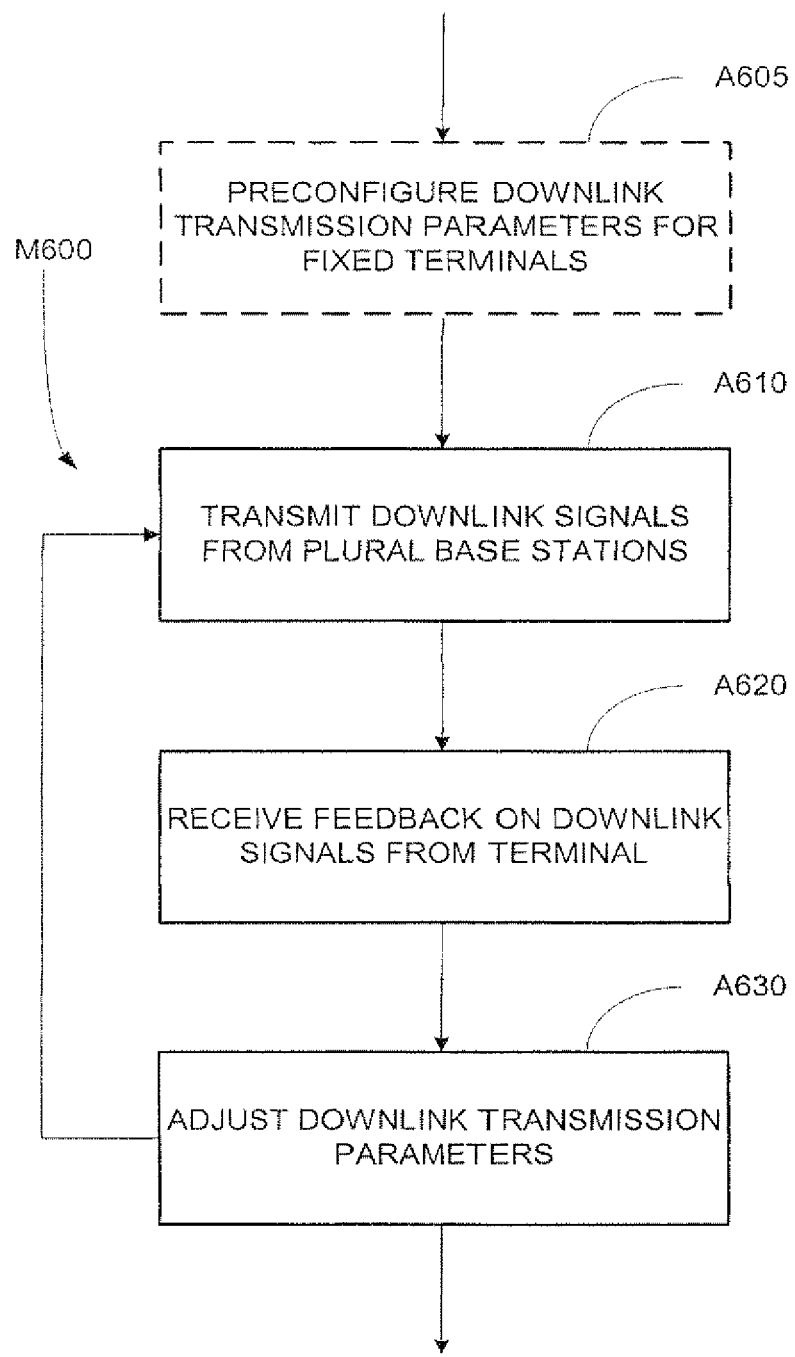
FIG. 6 illustrates an example method for transmitting downlink signals to a terminal from plural base stations.

FIG. 6 broadly illustrates a method M600 for wirelessly communicating with the terminal 240 using the plural base stations 210-1, 210-2 and 210-3. The method can optionally begin at act A605 in which transmission parameters are set for the plural base station 210-1, 210-2 and 210-3. As explained later, this is particularly advantageous when the terminal 240 is in a fixed location.

The communication with the terminal 240 commences in act A610 in which a downlink signal from each of the plural base stations 210-1, 210-2 and 210-3 is transmitted to the terminal 240. The plural downlink signals all carry same information to the terminal 240, and each downlink signal is transmitted on a corresponding downlink channel. For each downlink channel, there can be plural taps. The terminal 240 is arranged to provide feedback information on one or more taps of the downlink channels used in the transmission. Preferably, information on the tap(s) of each downlink channel are provided as feedback.

The terminal 240 is arranged to measure the downlink channel corresponding to each base station 210-1, 210-2 and 210-3 and to feed back channel information to the network. The information fed back can be partial, the particulars of which are explained further below. The downlink channel information is used by the base stations 210-1, 210-2 and 210-3 to choose the pre-filtering operation that will allow coherent combining of the downlink signals transmitted by the base stations 210-1, 210-2 and 210-3 to the terminal 240.

In act A620, the feedback from the terminal 240 is received, for example, by the anchor base station 210-1. Then in act A630, the transmission parameters for each downlink signal are adjusted based on the feedback information received from the terminal 240. Acts A610, A620 and A630 can be periodically performed to continuously or intermittently adapt to changing situations, for example, when the terminal 240 is mobile.

Figure 7:
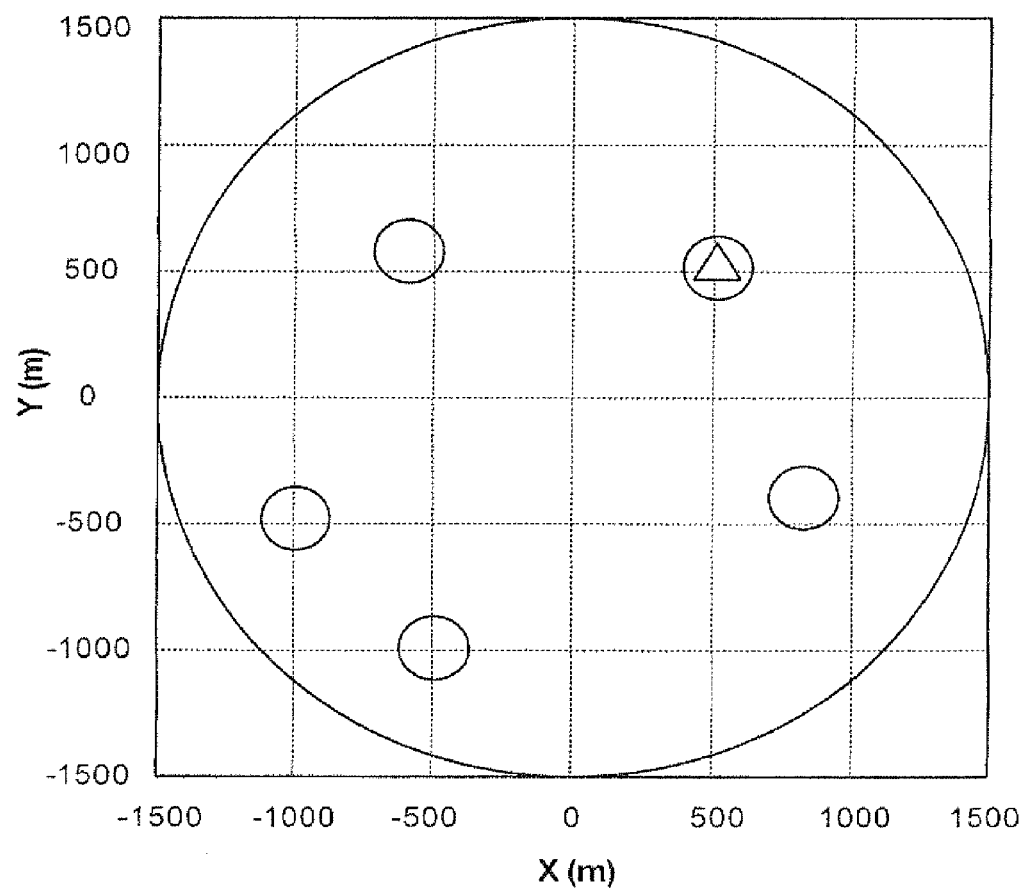
FIG. 7 illustrates an example modeling in which the flashlight effect is negated.

Unlike a conventional set up in which transmission using a downlink channel from a single base station with multiple antennas is performed, in the embodiment of FIG. 2, plural base stations 210-1, 210-2 and 210-3 are utilized. The transmission parameters—i.e., coefficients $\alpha_i(m)$ and delays $\tau_i$ of the taps—are adjusted in a way such that within the serving area of the plural base stations 210-1, 210-2 and 210-3, the energy of the downlink signals is enhanced in the vicinity of the terminal 240 and suppressed in all other regions of the serving area. That is, the flash light effect is reduced. This in turn reduces the likelihood of interferences occurring to other terminals in the serving area as illustrated in FIG. 7 due to the transmission to the terminal 240 by the plural base stations 210-1, 210-2 and 210-3. In FIG. 7, the region of high signal energy at the desired coordinates (500, 500) remains as illustrated by the triangle enclosed by the circle. However, other regions in which undesirable high energy occurred are not present in FIG. 7 as illustrated by circles at the same locations as FIG. 5 but without the "X" enclosed therein.

As mentioned previously, the plural downlink signals coherently combine at the vicinity of the terminal 240 due to the adjustments made to the transmission parameters. This is despite the fact that the plural base stations 210-1, 210-2 and 210-3 are geographically spaced apart from each other. That is, the signals coherently combine despite that the shadowing characteristics of the downlink channel from one base station 210 is independent—different—of the shadowing characteristics of the downlink channel from another base station 210.

This is different from a situation in which multiple antenna elements of a single base station are used to transmit the downlink signal. In this instance, the shadowing characteristics of the signal transmitted from each antenna element is very similar, if not the same, to one another.

It is also noted that each base station 210 is a fully functioning base station. Thus, each of the plural base stations 210-1, 210-2 and 210-3 is capable on its own to communicate with any terminal within the coverage area independently of other base stations. That is, each base station 210 can operate in a conventional manner.

Referring back to FIG. 6, the acts A620 and A630 can be performed by the anchor base station 210-1. In general, the anchor base station 210-1 is arranged to coordinate the radio resource management in the network. The anchor base station 210-1 can identify a set of candidate base stations that may be used to transmit the desired signal to the terminal 240. The downlink signal transmissions are scheduled at the anchor base station 210-1 and the plural base stations 210-1, 210-2 and 210-3 in turn execute the transmissions in a synchronized fashion.

Figure 8:
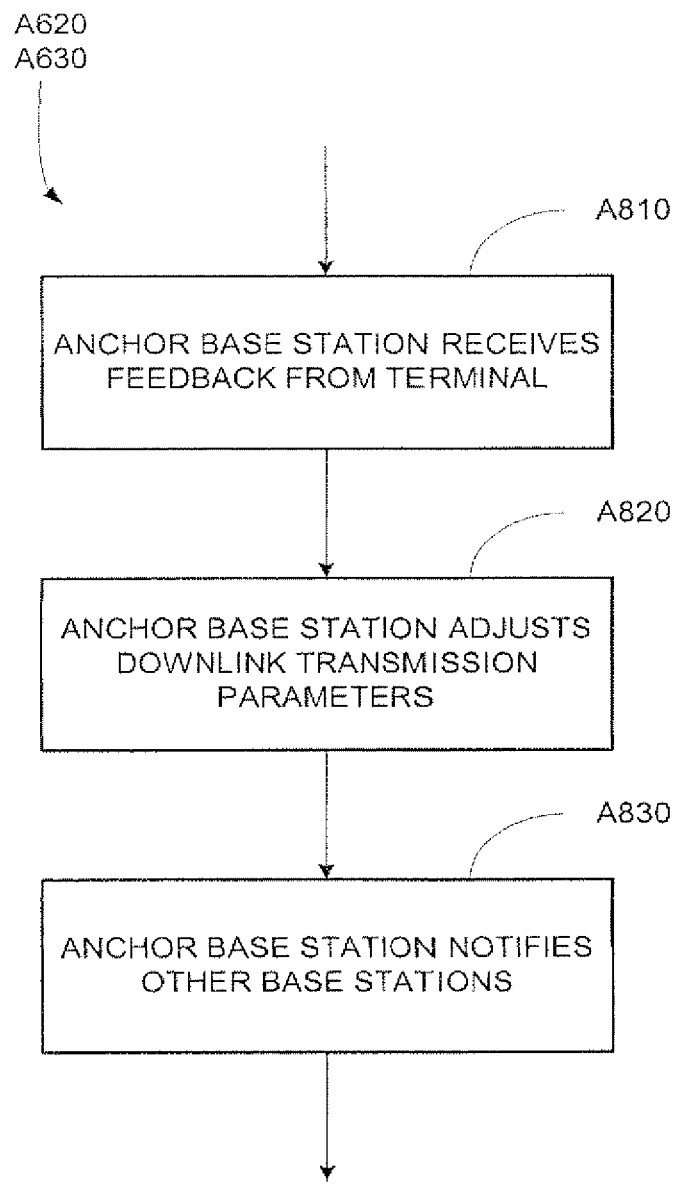
FIG. 8 illustrates an example method for coordinating the operations of transmitting downlink signals from plural base stations.

FIG. 8 broadly illustrates a method that the anchor base station 210-1 may perform to coordinate downlink signal transmissions of the plural base stations 210-1, 210-2 and 210-3. In act A810, the anchor base station 210-1 receives the feedback information from the terminal, 240. In act A820, the anchor base station adjusts (or determines the adjustments of) the transmission parameters for each downlink signal based on the feedback information received from the terminal 240. As an example, the anchor base station 210-1 may determine adjustments to the coefficients $\alpha_i(m)$ and the delays $\tau_i$ of the taps of the downlink channel for not only itself, but for downlink channels of the other base stations 210-2 and 210-3 based on the feedback information. The anchor base station 210-1 then can notify the other base stations 210-2 and 210-3 of the adjusted parameters in act A830. Note that the transmission parameters adjusted for each base station 210-1, 210-2 and 210-3 can be independent of the transmission parameters adjusted for other base stations.

Again referring to FIG. 2, it is preferred that TDCF is employed as the feedback mechanism so that the amount of information provided as feedback is constrained to a manageable level. When TDCF is employed, the feedback from the terminal 240 is such that for each downlink channel, the feedback includes information on a subset of the taps of the downlink channel. The number of taps L in the subset is less than the total number M of taps of the downlink channel for the corresponding base station 210.

The L highest energy taps, taps that exceeds the predetermined individual threshold energy level, taps whose sum of energies exceeds the predetermined cumulative threshold level or the predetermined percentage threshold, etc. may be chosen. The criteria for choosing the taps to report on can be individualized for each channel. As an example, for the anchor base station 210-1, the predetermined individual threshold energy level criteria may be used while the L highest energy taps criteria may be used for the base station 210-2. Even if the same type of criteria is used, the predetermined level can be individualized for each channel. As an example, the number L may be set at to "1" for the base station 210-1 and at "2" for the base station 210-2. Also, total power $\sigma_x^2$ transmitted from the antennas of each base station can be set at an individual predetermined level for each base station 210-1, 210-2 and 210-3.

The feedback information preferably includes the delay $\tau_i$ associated with each tap of the downlink channel that is reported back.

The amount of information fed back for TDCF can be greatly reduced in a TDD system by using the property of channel reciprocity may be used. In channel reciprocity, the observed channel characteristics are substantially identical for the receive and transmit directions (or uplink and downlink as the case may be), so long as the transmission occurs within the time and frequency coherence limitations of the system. One result is that the channel remains virtually unchanged for sufficiently short differences in durations, as well as sufficiently close spacing of frequency resources. In a TDD system, the same time-frequency resources are used for both directions of transmissions; therefore the channel characteristics are identical.

By combining the use of TDCF with plural base stations, the energy of the signals can be enhanced at the desired location—the vicinity of the terminal—and suppressed in the rest of the serving area as illustrated in FIG. 7.

The signal can be even further suppressed in the undesirable locations when beam formers are combined with the use of TDCF for the plural base stations. As illustrated in FIG. 3, the beam forming unit 340—under the control of the control unit 360—is arranged to form one or more beams for the downlink signals transmitted through the antenna elements 310. The beam forming unit 340 is arranged in a way that maximizes the focus of carrier energy to the desired terminal 240, while suppressing the level of that same signal below a threshold in the rest of the serving area.

Figure 9:
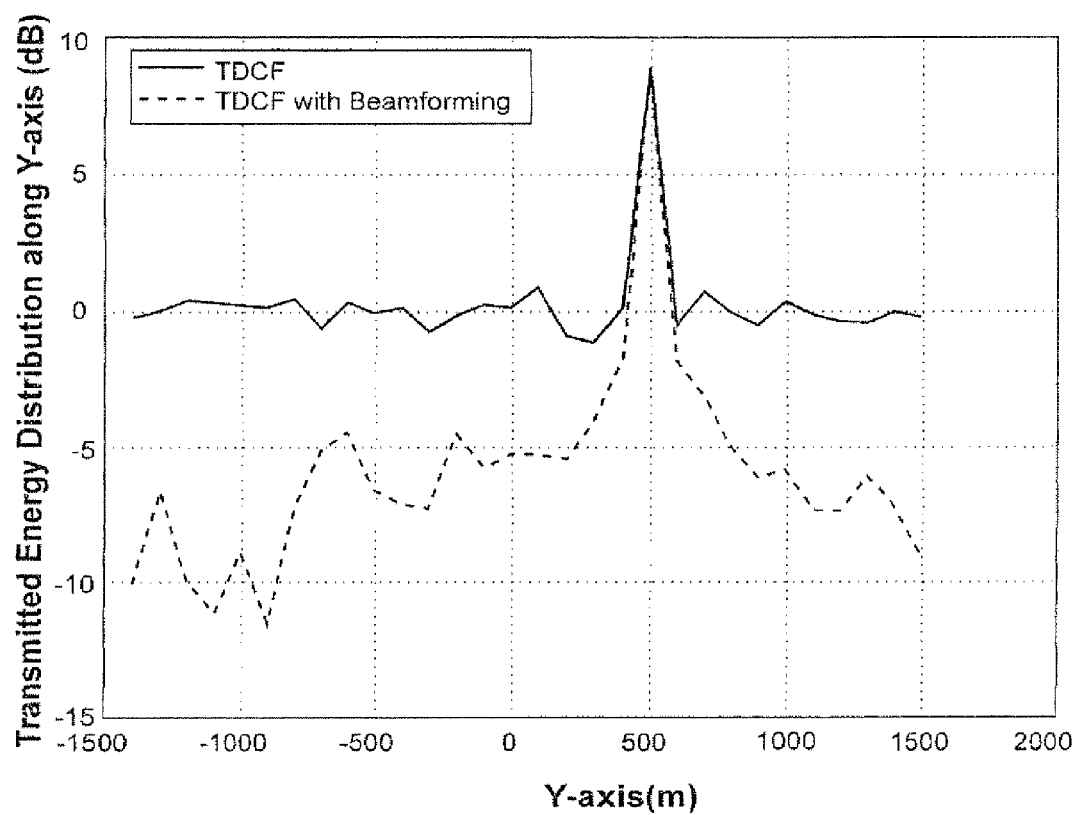
FIG. 9 illustrates a comparison of signal energy suppression of between TDCF (Transmit Diversity with Constrained Feedback) without beam forming and TDCF with beam forming.

An advantage of beam forming is illustrated in FIG. 9. It is seen that TDCF without beam forming (solid line) produces very good results. The signal energy is maximized at the desired location (at y coordinate 500) and is suppressed to substantially 0 dB level else where in the coverage area. But with beam forming (dashed line), the results are even more desirable. With beam forming, the energy level at the desired location is substantially the same as that without beam forming. But in other areas (non-desired locations), the energy level is suppressed further.

When beam forming is used, the terminal 240 can identify the beam used to transmit the downlink channel and provide the identity as part of the feedback information. The base stations 210, including the anchor base station 210-1, can determine an angle of arrival of the uplink signal from the terminal 240. Using the angle of arrival information and the feedback information which includes the identities of the beams used to transmit the taps, the anchor base station 210-1 can choose the beam on which the transmissions will occur for the plural base stations 210-1, 210-2 and 210-3. In other words, the anchor base station 210-1 can choose the beam or beams that point in the direction, of the terminal 240. This is in addition to choosing the pre filtering operation described above to allow coherent combining of the signals transmitted by the plural base stations 210-1, 210-2 and 210-3.

One or more non-limiting embodiments are applicable to situations in which the terminals in the system are nomadic or fixed. The embodiments are also especially applicable in which the terminals in the system are radio relays that re-modulate or re-radiate the transmitted signal over a smaller coverage area in the vicinity of the relay. The purpose of the relay is usually that of coverage extension. Alternatively, the radio relay may be considered as a way of enhancing capacity without dimensioning additional backhaul bandwidth for a complete base station.

In situations where relays are used for coverage extension, the amount of feedback is greatly reduced since the channel to a fixed coordinate changes very slowly. Also, the beam forming towards fixed relays can be preconfigured to give better pointing towards the receiver. In a system where a goal is to reach fixed terminals, data rates towards those fixed terminals can be greatly improved.

Although various embodiments have been shown and described in detail, the claims are not limited to any particular embodiment or example. None of the above description should be read as implying that any particular element, step, act, range, or function is essential such that it must be included in the claims scope. The scope of patented subject matter is defined only by the claims. The extent of legal protection is defined by the words recited in the allowed claims and their equivalents. It is to be understood that the invention is not to be limited to the disclosed embodiment, but on the contrary, is intended to cover various modifications and equivalent arrangements.

What is claimed is:

1. An apparatus for operation in a communication network, wherein the apparatus comprises:
   a control unit configured to:
      receive a feedback from a terminal regarding a plurality of downlink signals that have each been transmitted by one of a plurality of base stations on a corresponding downlink channel of the respective base station, wherein the plurality of downlink signals carry same information to the terminal and wherein each of the downlink channels includes a plurality of taps;
      adjust transmission parameters for each downlink signal based on the feedback from the terminal; and
      notify one or more of the plurality of base stations regarding the adjusted transmission parameters,
      wherein the feedback from the terminal includes information regarding one or more of the plurality of taps of the downlink channel of each base station.

2. The apparatus of claim 1, wherein the control unit is configured to adjust the transmission parameters such that, within a serving area of the plurality of base stations, an energy of the transmitted downlink signals is enhanced in a vicinity of the terminal and suppressed in all other regions of the serving area.

3. The apparatus of claim 1, wherein the control unit is configured to adjust the transmission parameters such that the plurality of downlink signals will coherently combine in a vicinity of the terminal.

4. The apparatus of claim 1, wherein the control unit is configured to receive feedback from the terminal by receiving feedback that includes information on a subset of a plurality of taps of a downlink channel model, the subset spanning a duration less than the entire span in time of the downlink channel.

5. The apparatus of claim 4, wherein, for each downlink channel, the subset of the plurality of taps includes any one of:
   a predetermined number of taps with highest energy levels received by the terminal;
   one or more taps whose energy level received by the terminal individually exceeds a predetermined individual threshold energy level;
   one or more taps whose energy level received by the terminal cumulatively exceeds a predetermined cumulative threshold energy level; or
   one or more taps whose energy level received by the terminal cumulatively exceeds a predetermined percentage threshold of the total energy level of the downlink channel received by the terminal.

6. The apparatus of claim 4, wherein the control unit is configured to receive feedback from the terminal by receiving feedback that includes a time delay associated with each tap of the subset of taps for the downlink channel.

7. The apparatus of claim 6, wherein:
   the controller is configured to adjust transmission parameters by adjusting one or more coefficients $\alpha_i(m)$ associated with each downlink channel;
   each downlink signal received at the terminal on a corresponding downlink channel can be expressed as:

$$x(t) = \sum_{m=1}^{M} h(t, m) * g(t, m) * s(t)$$

with "*" denoting convolution, x(t) representing the respective downlink signal as received at the terminal, g(t,m) representing an impulse response of the corresponding downlink channel from an m-th transmission antenna of the corresponding base station to the terminal, s(t) representing a modulated base band signal, and h(t,m) representing an impulse response of a pre-filter of the m-th transmission antenna of the base station; and
each pre-filter h(t,m) comprises a finite impulse response (FIR) filter with a predetermined number of taps such that:

$$h(t, m) = \bar{\lambda} \sum_{i=1}^{L} \alpha_i(m) \delta(t - \tau_i)$$

with L representing a number of taps less than a total number of taps of the downlink channel, $\alpha_i(m)$ representing coefficients for an m-th pre-filter, $\tau_i$ representing a delay corresponding to the coefficients $\alpha_i(m)$, and $\bar{\lambda}$ representing a scaling factor used to ensure that a transmitted power of the base station is at a predetermined level.

8. The apparatus of claim 7, wherein the number of taps L of the downlink channel for each base station is independent of the number of taps L of the downlink channels of other base station.

9. The apparatus of claim 7, wherein the controller is configured to receive feedback from the terminal by receiving feedback that includes information on a position within a grid of evenly-spaced L fingers placed on a region of energy of the downlink signal indicated by a power/delay profile such that grid positions and finger position are same for all transmission antennas of the base station.

10. The apparatus of claim 7, wherein the controller is configured to receive feedback from the terminal by receiving feedback that includes information on delays $\tau_i$ of each of the L taps of the corresponding downlink channel for each base station, and wherein the controller is configured to adjust transmission parameters by adjusting delays $\tau_i$ such that L maximal channel coefficients are chosen for each pre-filter.

11. The apparatus of claim 4, wherein the controller is configured to receive feedback from the terminal by receiving feedback that includes information indicating a beam associated with each tap of the subset of taps of the downlink channel, and wherein the controller is configured to adjust transmission parameters by adjusting transmission parameters associated with the indicated beam.

12. The apparatus of claim 11, wherein the controller is further configured to preconfigure the transmission parameters for a fixed terminal to optimize the beams transmitted from the plurality of base stations to the fixed terminal prior to the transmitting the downlink signals from the plurality of base stations.

13. The apparatus of claim 4, wherein the controller is configured to adjust transmission parameters by adjusting transmission parameters for each base station such that a total amount of power of the downlink signal transmitted by the base station is at a predetermined power level.

14. The apparatus of claim 13, wherein the predetermined power level set for one base station is independent of the predetermined power level set for another base station.

15. A system for transmitting downlink signals to a terminal, the system comprising:
a plurality of base stations each configured to transmit a respective downlink signal to a terminal on a corresponding downlink channel, wherein the plurality of downlink signals transmitted by the base stations carry same information to the terminal;
the terminal configured to transmit a feedback regarding the plurality of downlink signals to an anchor base station, wherein the feedback includes information regarding one or more taps of each downlink channel corresponding to each base station; and
the anchor base station configured to:
receive the feedback from the terminal; and
adjust transmission parameters for each downlink signal based on the feedback from the terminal.

16. The system of claim 15, wherein the plurality of base stations are geographically spaced apart from each other such that shadowing characteristics of the downlink channel from one base station is independent of shadowing characteristics of another base station.

17. The system of claim 15, wherein each of the plurality of base stations is capable of communicating with the terminal independent of the other base stations.

18. The system of claim 15, wherein the anchor base station is configured to adjust the transmission parameters such that, within a serving area of the plurality of base stations, an energy of the transmitted downlink signals is enhanced in a vicinity of the terminal and suppressed in all other regions of the serving area.

19. The system of claim 15, wherein the anchor base station is configured to adjust the transmission parameters such that the plurality of downlink signals will coherently combine in a vicinity of the terminal.

20. The system of claim 15, wherein the terminal is configured to transmit feedback to the anchor base station by transmitting feedback that includes information on a subset of a plurality of taps of a downlink channel model, the subset spanning a duration less than the entire span in time of the downlink channel.

21. The system of claim 20, wherein, for each downlink channel, the subset of the plurality of taps includes any one of:
a predetermined number of taps with highest energy levels received by the terminal;
one or more taps whose energy level received by the terminal individually exceeds a predetermined individual threshold energy level;
one or more taps whose energy level received by the terminal cumulatively exceeds a predetermined cumulative threshold energy level; or
one or more taps whose energy level received by the terminal cumulatively exceeds a predetermined percentage threshold of the total energy level of the downlink channel received by the terminal.

22. The system of claim 20, wherein the terminal is configured to transmit feedback to the anchor base station by transmitting feedback that includes a time delay associated with each tap of the subset of taps for the downlink channel.

23. The system of claim 22, wherein:
each of the plurality of base stations comprises a plurality of transmission antennas;
the anchor base station is configured to adjust transmission parameters by adjusting one or more coefficients $\alpha_i(m)$ associated with each downlink channel;
each downlink signal received at the terminal on a corresponding downlink channel can be expressed as:

$$x(t) = \sum_{m=1}^{M} h(t, m) * g(t, m) * s(t)$$

with "*" denoting convolution, x(t) representing the respective downlink signal as received at the terminal, g(t,m) representing an impulse response of the corresponding downlink channel from an m-th transmission antenna of the corresponding base station to the terminal, s(t) representing a modulated base band signal, and h(t,m) representing an impulse response of a pre-filter of the m-th transmission antenna of the base station; and
each pre-filter h(t,m) comprises a finite impulse response (FIR) filter with a predetermined number of taps such that:

$$h(t, m) = \bar{\lambda} \sum_{i=1}^{L} \alpha_i(m) \delta(t - \tau_i)$$

with L representing a number of taps less than a total number of taps of the downlink channel, $\alpha_i(m)$ representing coefficients for an m-th pre-filter, $\tau_i$ representing a delay corresponding to the coefficients $\alpha_i(m)$, and $\bar{\lambda}$ representing a scaling factor used to ensure that a transmitted power of the base station is at a predetermined level.

24. The system of claim 23, wherein the number of taps L of the downlink channel for each of the plurality of base stations is independent of the number of taps L of the downlink channels of other base stations.

25. The system of claim 23, wherein the terminal is configured to transmit feedback to the anchor base station by transmitting feedback that includes information on a position within a grid of evenly-spaced L fingers placed on a region of energy of the downlink signal indicated by a power/delay profile such that grid positions and finger position are same for all transmission antennas of the base station.

26. The system of claim 23, wherein the terminal is configured to transmit feedback to the anchor base station by transmitting feedback that includes information on delays $\tau_i$ of each of the L taps of the corresponding downlink channel for each base station, and wherein the anchor base station is configured to adjust transmission parameters by adjusting delays $\tau_i$ such that L maximal channel coefficients are chosen for each pre-filter.

27. The system of claim 20, wherein the terminal is configured to transmit feedback to the anchor base station by transmitting feedback that includes information indicating a beam associated with each tap of the subset of taps of the downlink channel, and wherein the anchor base station is configured to adjust transmission parameters by adjusting transmission parameters associated with the indicated beam.

28. The system of claim 27, wherein the anchor base station is further configured to preconfigure the transmission parameters for a fixed terminal to optimize the beams transmitted from the plurality of base stations to the fixed terminal prior to the transmitting the downlink signals from the plurality of base stations.

29. The system of claim 20, wherein the anchor base station is configured to adjust transmission parameters by adjusting transmission parameters for each base station such that a total amount of power of the downlink signal transmitted by the base station is at a predetermined power level.

30. The system of claim 29, wherein the predetermined power level set for one base station is independent of the predetermined power level set for another base station.

* * * * *

UNITED STATES PATENT AND TRADEMARK OFFICE
CERTIFICATE OF CORRECTION

PATENT NO. : 8,526,891 B2  
APPLICATION NO. : 13/162044  
DATED : September 3, 2013  
INVENTOR(S) : Balachandran et al.

Page 1 of 1

It is certified that error appears in the above-identified patent and that said Letters Patent is hereby corrected as shown below:

In the Specification

In Column 2, Line 4, delete "art, is" and insert -- art is --, therefor.

In Column 4, Line 64, delete "FIG. 1A," and insert -- FIGS. 1A, --, therefor.

In Column 9, Line 39, delete "terminal, 240." and insert -- terminal 240. --, therefor.

Signed and Sealed this  
Third Day of March, 2015

Michelle K. Lee  
*Deputy Director of the United States Patent and Trademark Office*